US010444813B2

(12) United States Patent
Subramanian et al.

(10) Patent No.: US 10,444,813 B2
(45) Date of Patent: Oct. 15, 2019

(54) MULTI-CRITERIA POWER MANAGEMENT SCHEME FOR POOLED ACCELERATOR ARCHITECTURES

(71) Applicant: Intel Corporation, Santa Clara, CA (US)

(72) Inventors: Rasika Subramanian, Hillsboro, OR (US); Francesc Guim Bernat, Barcelona (ES); Steen Larsen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 111 days.

(21) Appl. No.: 15/718,451

(22) Filed: Sep. 28, 2017

(65) Prior Publication Data

US 2019/0094926 A1    Mar. 28, 2019

(51) Int. Cl.
*G06F 1/32*    (2019.01)
*G06F 1/3206*    (2019.01)
*G06F 1/3287*    (2019.01)
*G06F 1/3209*    (2019.01)

(52) U.S. Cl.
CPC .......... *G06F 1/3206* (2013.01); *G06F 1/3209* (2013.01); *G06F 1/3287* (2013.01)

(58) Field of Classification Search
CPC ..... G06F 1/3206; G06F 1/3209; G06F 1/3287
See application file for complete search history.

(56) References Cited

U.S. PATENT DOCUMENTS 8,423,799 B2 * 4/2013 Krishnamurthy ..... G06F 1/3203
     713/300
8,578,384 B2 * 11/2013 Zhang ................... G06F 1/3203
     718/103
10,101,786 B2 * 10/2018 Eastep .................. G06F 1/3203
2016/0308718 A1 10/2016 Lanka et al.
2016/0335215 A1 11/2016 Biran et al.

FOREIGN PATENT DOCUMENTS

JP    2016053996 A    4/2016
KR    20170013587 A    2/2017
WO    2007149884 A2    12/2007

OTHER PUBLICATIONS

International Search Report and Written Opinion for Application No. PCT/US2018/053471, dated Jan. 16, 2019, 9 pages.

\* cited by examiner

*Primary Examiner* — Stefan Stoynov
(74) *Attorney, Agent, or Firm* — Alliance IP, LLC

(57) ABSTRACT

A computing device, a method and a system to control power. The computing device is configured to be used as part of a network fabric including a plurality of nodes and a plurality of pooled accelerators coupled to the nodes. The computing device includes: a memory storing instructions; and processing circuitry configured to perform the instructions. The processing circuitry is to receive respective requests from respective ones of the plurality of nodes, the requests addressed to a plurality of corresponding accelerators, each of the respective requests including information on a kernel to be executed by a corresponding accelerator, on the corresponding accelerator, and on a performance target for execution of the kernel. The processing circuitry is further to, based on the information in said each of the respective requests, control a power supply to the corresponding accelerator.

25 Claims, 4 Drawing Sheets

216

Telemetry/Power Table

| Accelerator | Current Performance | Current Power | Threshold Power |
|---|---|---|---|
| Accelerator 1 | A FLOPS | X Watts | X' Watts |
| Accelerator 2 | B FLOPS | Y Watts | Y' Watts |
| Accelerator 3 | C FLOPS | Z Watts | Z' Watts |

MULTI-CRITERIA POWER MANAGEMENT SCHEME FOR POOLED ACCELERATOR ARCHITECTURES

TECHNICAL FIELD

Embodiments described herein generally relate to power management relating to data centers using subsystem aggregation.

BACKGROUND

As data center architectures evolve, such architectures contemplate moving from a rack implementation using shared power, shared cooling and management at a rack level, to more disaggregated implementations involving subsystem aggregation and the use of pooled computer resources, pooled storage and memory, and/or shared booting. Changes to power management schemes are needed for the newly emerging data center and network fabric architectures.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
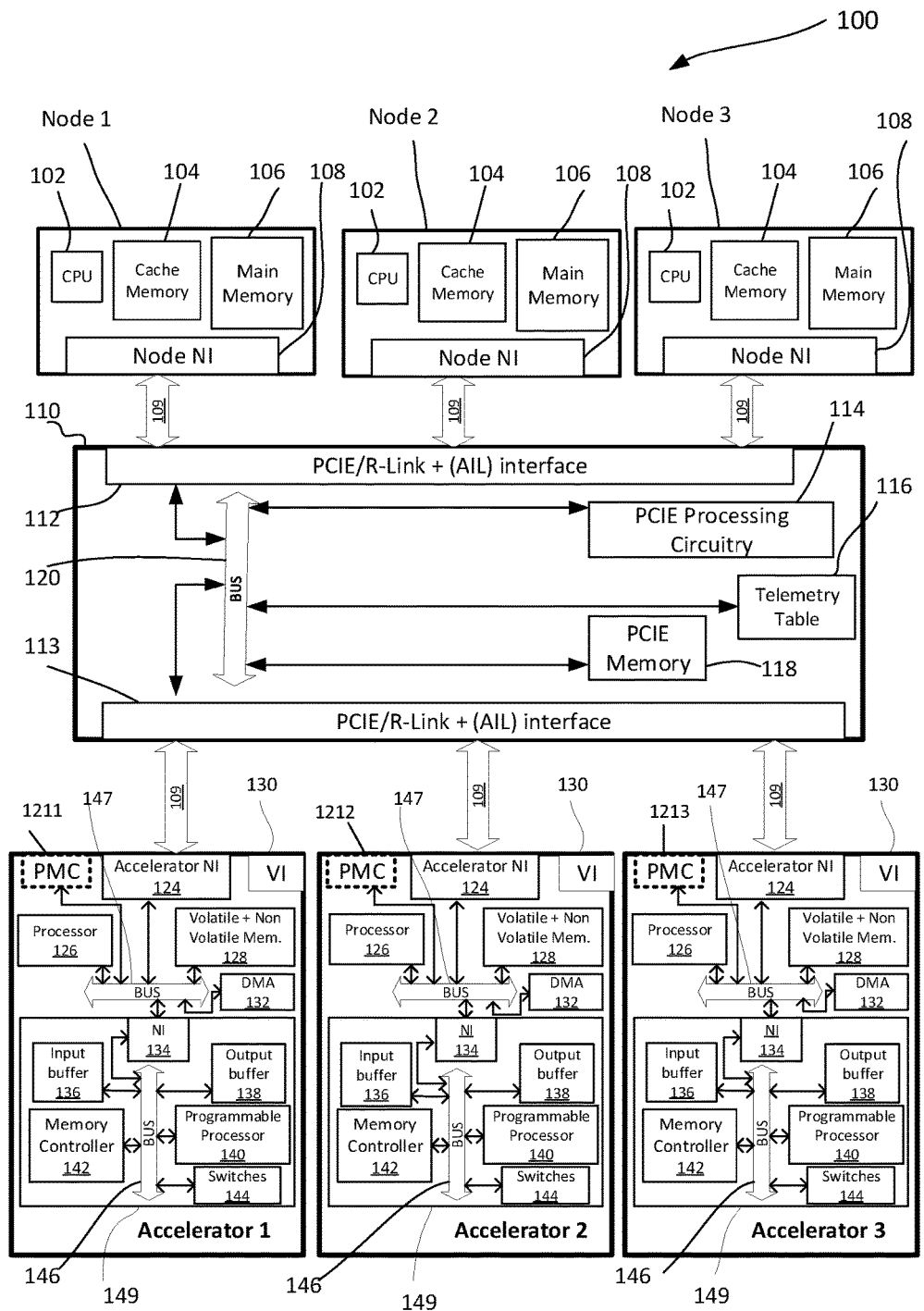
FIG. 1 is a schematic illustration of a computing environment including a plurality of nodes communicatively coupled to a plurality of pooled accelerators by way of a switch according to some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

For simplicity and clarity of illustration, the drawing figures illustrate the general manner of construction, and descriptions and details of well-known features and techniques may be omitted to avoid unnecessarily obscuring the discussion of the described embodiments of the invention. Additionally, elements in the drawing figures are not necessarily drawn to scale. For example, the dimensions of some of the elements in the figures may be exaggerated relative to other elements to help improve understanding of the disclosed embodiments. The same reference numerals in different figures denote the same elements, while similar reference numerals may, but do not necessarily, denote similar elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Similarly, if a method is described herein as comprising a series of actions, the order of such actions as presented herein is not necessarily the only order in which such actions may be performed, and certain of the stated actions may possibly be omitted and/or certain other actions not described herein may possibly be added to the method. Furthermore, the terms "comprise," "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

The term "coupled," or "communicatively coupled," as used herein, is defined as directly or indirectly connected in an electrical or non-electrical manner. "Processing circuitry" as used herein may refer to a single instance of a processor block in a distinct physical location, or to multiple processor blocks in various physical locations within a platform, and may be implemented in hardware, firmware, software, or in a combination of the same. "Memory" as used herein may refer to a single instance of a memory block in a distinct physical location, or to multiple memory blocks in various locations within a platform, and may likewise be implemented in hardware, firmware, software, or a combination of the same.

Although the following embodiments are described with reference to energy conservation and energy efficiency in specific computing environments, such as those including computing platforms or processors, similar techniques and teachings of embodiments described herein may be applied to other types of circuits or semiconductor devices that may also benefit from better energy efficiency and energy conservation. For example, the disclosed embodiments are not limited to any particular type of computing environment such as a rack scale architecture data center. That is, disclosed embodiments may be used in many different system types, ranging from server computers (e.g., tower, rack, blade, micro-server and so forth), communications systems, storage systems, desktop computers of any configuration, laptop, notebook, and tablet computers (including 2:1 tablets, phablets and so forth), and may be also used in other devices, such as handheld devices, wearables, IoT devices, to name just a few.

Embodiments are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future, such as for power conservation and efficiency in products that encompass a large portion of the US economy.

According to the state of the art, pooled accelerators within data centers are known to use a fixed amount of power depending on their respective power requirements. By "pooled accelerators", what is meant in the context of embodiments is a group of two or more accelerators connected through a switch, and "pooled" together, either within the same rack/chassis, or on a different rack and/or at a different location in the data center, the pooling being with respect to nodes that are to issue kernels for execution to the accelerators. By having a fixed power supply, however, data center architectures are not able to achieve optimum load balance and smart power allocation based on performance requirements of the workload on a given accelerator. By way of example, according to the current state of the art, if an application A issues instructions to Accelerator 1 to run an accelerated kernel a, given that Accelerator 1 is at a fixed power supply, it may take 100 seconds for kernel a to run on Accelerator 1. However, a Service Level Agreement (SLA) associated with application A may have a time requirement of 200 seconds. Assuming that there is a relation between power and performance, kernel a could be executed with half the power supplied to Accelerator 1 and still satisfy the SLA timing requirements. The remaining power could then be provided to other accelerators that are running accelerated kernels with more stringent SLA requirements than that of Accelerator 1. The SLA may for example be based on time requirements, and/or on power performance requirements, as would be recognized by a skilled person.

Embodiments propose a mechanism to more efficiently utilize power in pooled accelerators and heterogenous workload architectures which have differing performance requirements. One goal of embodiments is to reduce a total cost of ownership (TCO) of a computing environment while providing a flexible architecture that allows smart power load balancing schemes based on performance requirements of each component.

Some embodiments include a switch configured to connect a plurality of computer nodes (nodes) to a plurality of accelerators. According to some demonstrative embodiments, a node may access any and all accelerators to which it is connected through the switch. The switch may include, by way of example, as a fabric interconnect switch used for Transmission Control Protocol (TCP) or User Datagram Protocol (UDP) communication and/or Remote Direct Memory Access (RDMA). The switch may include, by way of example, a coherent switch including one or more interconnects of a communication protocol that provides for cache coherent transactions. The switch may for example include a memory switch. The switch may for example include a Peripheral Component Interconnect Express) PCIe switch, or any suitable high-speed serial computer expansion bus. The switch may include a memory device to store instructions, and a processing circuitry coupled to the memory. The switch may be configured to process a request from a node of the plurality of nodes, and to determine, using the instructions within the memory and based on the request, a kernel to be issued to an accelerator of the plurality of accelerators and a performance target for the kernel. The switch may further be configured to control a power supply to be delivered to the accelerator based on the performance target for the kernel. The switch may be configured to perform the above functions for each one of the plurality of accelerators.

The switch may include a telemetry table including data mapping each of the plurality of accelerators with their current performance level, their current power supply level and their threshold power supply level. The switch may control the amount of power supplied to each accelerator based on the current performance level of the accelerator, based on the current power supply level of the accelerator and based on the accelerator's threshold power supply level. For example, the switch may be configured to decrease the amount of power supplied to each accelerator in response to a determination that the current performance level of the accelerator is above the performance target. Similarly, the switch may be configured to decrease the amount of power supplied to each accelerator in response to a determination that the current performance level of the accelerator is below the performance target. The switch may be configured to adjust power to each accelerator based on the accelerator's threshold power level. The switch may further be configured to monitor the current performance level of each accelerator and to adjust the power supplied to the accelerator based on updated current performance levels of the accelerator based on the monitoring.

The switch may further be configured to redirect power from one of the accelerators to another one of the accelerators based on their respective current performance levels and respective performance targets.

Exemplary embodiments will now be described in further detail in relation to FIGS. 1-4 below.

FIG. 1 is a schematic illustration of a computing environment 100 such as a portion of a network fabric including computing devices such as nodes, a switch, and pooled accelerators. The nodes in the shown environment include Node 1, Node 2 and Node 3. The nodes are shown as being communicatively coupled to a plurality of pooled accelerators, Accelerator 1, Accelerator 2 and Accelerator 3, by way of a switch 110, according to some demonstrative embodiments. Although only three nodes Node 1, Node 2 and Node 3, only three accelerators Accelerator 1, Accelerator 2 and Accelerator 3, and only one switch 110 are shown in FIG. 1, computing environment 100 may include any suitable number of computing nodes, accelerators and switches coupled to each other via a network fabric connections, such as a low latency network fabric connections 109. The nodes as shown herein each may include a Central Processing Unit (CPU) 102, a cache memory 104, a main memory 106 and a node network interface 108. Each node may include any suitable number of processors and cores within each CPU, field programmable gate arrays (FPGAs), controllers, memories and/or other components as would be recognized by one skilled in the art. Computing environment may represent any suitable computing environment, such as a high-performance computing environment, a datacenter, a communications service provider infrastructure (e.g., one or more portions of an Evolved Packet Core), an in-memory computing environment, another computing environment, or a combination thereof.

Switch 110 may for example include an ingress interface 112, for example on a per node basis, to receive and queue a payload from an associated node, and an egress interface 113, for example on a per accelerator basis, to queue the payload after processing through for transmission from the switch. The ingress interface 112 and egress interface 113 may for example include a PCIe interface as shown, and may further include interfaces for the transmission of power or voltage signals to each one of the accelerators Accelerator 1, Accelerator 2 and Accelerator 3.

Switch 110 further may include a switch processing circuitry 114 and a switch memory 118 that stores instructions to be executed by the switch processing circuitry 114. In addition, switch 110 may include a power table or telemetry table 116. The telemetry table 116 may include information mapping each of the plurality of pooled accelerators Accelerator 1, Accelerator 2 and Accelerator 3 with their current performance level, their current power level (current power supply level) and their threshold power level, the threshold power level being predetermined based for example on accelerator parameters and capabilities, as would be recognized by one skilled in the art. The telemetry table 116 may also include other telemetry regarding each accelerator. Switch 110 may include other components thereon as would be recognized by one skilled in the art, although not shown. The components of switch 110, such as interface 112, interface 113, switch processing circuitry 114, switch memory 118, and telemetry table 116 may be communicatively coupled to one another on switch 110, such as by way of a bus 120 as shown, and/or directly to one another.

Referring now to each accelerator, Accelerator 1, Accelerator 2 and Accelerator 3, may each include an Accelerator Network Interface (NI) 124, a processor 126, an accelerator memory 128 including a volatile memory and non-volatile memory 128, and a Direct Memory Access component (DMA) 132, all of which may be interconnected, such as by way of a bus 147 and/or directly. The DMA may be used for "memory to memory" copying, or for moving of data within a memory, as would be recognized by one skilled in the art. Each accelerator may further include an accelerator unit 149, which may in one embodiment be an accelerator unit SoC, such as an Field Programmable Gate Array based accelerator unit. Accelerator unit 149 may include a network interface (NI) 134, an input buffer 136, and output buffer 138, a memory controller 142, a programmable processor 140, and a series of switches 144, all connected to one another by way of bus 146. The accelerator unit may be connected to the other components of the accelerator by way of NI 134, and further by way of bus 147 and/or directly. In addition, each accelerator may, according to one embodiment, include a Power Management Controller (PMC) therein (respectively PMCs 1211, 1212 and 1213 for each of Accelerator 1, Accelerator 2, Accelerator 3), the PMC being configured to control the amount of power to each accelerator for example through a voltage input (VI) 30 on each accelerator. VI 30 may include one or more voltage input pins. According to one embodiment, the PMC may be subsumed within the processor 126 of each accelerator. According to another embodiment, processor 126 and programmable processor 140 of each accelerator may collectively be referred to as a processing circuitry of the accelerator.

Embodiments include within their scope other components, or different components on each accelerator, an accelerator unit that is not FGPA-based, and pooled accelerators that are different from one another, it being noted that the structures shown for each of Accelerator 1, Accelerator 2 and Accelerator 3 in the shown embodiment are shown as being identical by way of example only. Additionally, an accelerator according to one embodiment may be configured to execute one kernel at a time, or it may be configured to execute more than one kernel at a time. Moreover, embodiments include within their scope accelerators that do not include a PMC onboard, where power management functions for the accelerators may be performed externally, such as, by way of example, within a switch such as switch 110, or within a PMC external to and communicatively coupled to the switch 110 (now shown), or within a PMC in the accelerators proper. By virtue of the many possible locations for the PMC, the PMCs in FIG. 1 are shown in broken lines.

Figure 2:
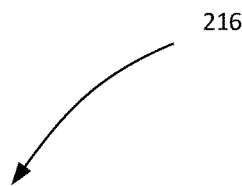
FIG. 2 is a telemetry/power table according to some demonstrative embodiments.

Referring now to FIG. 2, an example of a telemetry table 216 is shown, such as telemetry table 116 as part of switch 110 of FIG. 1. The telemetry table 216 may include information for each of Accelerator 1, Accelerator 2 and Accelerator 3. In particular, telemetry table 216 may include, for each accelerator, its current performance level in terms of quantity A, B, or C of floating point operations per second (FLOPS) for respective ones of Accelerator 1, Accelerator 2 and Accelerator 3. In addition, table 216 may include, for each accelerator, its current performance level in terms of quantity X, Y, or Z Watts for respective ones of Accelerator 1, Accelerator 2 and Accelerator 3. Moreover, table 216 may include, for each accelerator, its threshold power level in terms of quantity X', Y', or Z' Watts for respective ones of Accelerator 1, Accelerator 2 and Accelerator 3.

Power management schemes according to some embodiments will now be described in relation to FIGS. 1 and 2.

Referring now to FIGS. 1 and 2, The switch processing circuitry 114 may be coupled to the switch memory to retrieve instructions therefrom, and to execute the instructions to perform operations, the operations including, determining a kernel to be issued to an accelerator and a performance target for the kernel, and controlling an amount of power to be delivered to the accelerator based on the performance target for a kernel. According to one embodiment, switch 110 may be configured to adjust the amount of power supplied to each accelerator Accelerator 1, Accelerator 2 and Accelerator 3 based on the current performance level of each accelerator, based on the current power supply to each accelerator, and based on the threshold power supply to each accelerator. For example, according to one embodiment, the switch processing circuitry 114 may retrieve information regarding the current performance level of each accelerator Accelerator 1, Accelerator 2 and Accelerator 3 by accessing such information within the telemetry table 116/216 on the switch. For example, switch 110 may be configured to decrease the amount of power supplied to each accelerator Accelerator 1, Accelerator 2 and Accelerator 3 in response to a determination that the current performance level of the accelerator is above the performance target. Similarly, switch 110 may be configured to increase the amount of power supplied to each accelerator Accelerator 1, Accelerator 2 and Accelerator 3 in response to a determination that the current performance level of the accelerator is below the performance target.

Referring still to FIGS. 1 and 2, switch 110 may be configured to process a request from a node of the plurality of nodes, such as, for example, from Node 1. The request may be communicated to switch 110 by way of the ingress interface 112 and network fabric connections 109, and may be a request from Node 1 to switch 110 to issue a kernel, such as kernel a, to one of the accelerators, such as Accelerator 1, for execution by the accelerator. For example, switch 110 may issue kernel a to Accelerator 1 by way of the egress interface 113 and network fabric connections 109. The switch processing circuitry 114 may be configured to determine, using instructions within the switch memory 118 and based on the request from Node 1: (1) that kernel a is to be issued to Accelerator 1, and further (2) the performance level associated with the SLA for kernel a. Switch 110 may further be configured, for example through switch processing circuitry 114 and using instructions within switch memory 118, to control an amount of power to be delivered to Accelerator 1 based on the performance target for kernel a.

Referring still to FIGS. 1 and 2, switch 110, for example through switch processing circuitry 114 and using instructions within switch memory 118 and information within telemetry table 116/216, may be configured to decrease the amount of power supplied to Accelerator 1 in response to a determination that the current performance level of Accelerator 1 is above the performance target for kernel a. Similarly, switch 110, for example through switch processing circuitry 114 and using instructions within switch memory 118 and information within telemetry table 116/216, may be configured to increase the amount of power supplied to Accelerator 1 in response to a determination that the current performance level of Accelerator 1 is below the performance target of kernel a. Switch 110, for example through switch processing circuitry 114 and using instructions within switch memory 118 and information within telemetry table 116/216, may further be configured to adjust power to Accelerator 1 based on the accelerator's threshold power level. Switch 110, for example through switch processing circuitry 114 and using instructions within switch memory 118 and information within telemetry table 116/216, may further be configured to monitor the current performance level of Accelerator 1, to update the current performance level for Accelerator 1 in the telemetry table 116/216, and to adjust the power supplied to Accelerator 1 based on an updated current performance level of Accelerator 1 determined based on the monitoring.

Switch 110 may control power to Accelerator 1 in the manner described above, while keeping the amount of power supplied to Accelerator 1 within the threshold power level as set forth in the telemetry table 116/216. Switch 110 may for example include a mechanism therein, for example by way of the switch processing circuitry 114, to effect an initial set-up of the telemetry table 116/216 that includes threshold power levels for each of Accelerator 1, Accelerator 2 and Accelerator 3.

Although the above two paragraphs provide the example of an embodiment where one of the nodes send a request to the switch to issue one kernel to one accelerator (i.e. Node 1 sending a request to the switch to have Accelerator 1 execute kernel a), and where the switch then controls power to one accelerator (i.e. Accelerator 1), according to embodiments: (1) any number of nodes may transmit any number of requests to the switch; (2) each request may include a request for one or more kernels to be executed by one or more accelerators; (3) each accelerator may be configured to execute one or more kernels based on instructions from the switch; (4) the switch may be configured to control power to any number of accelerators based on various performance levels for respective kernels to be executed by the accelerators; and (5) the switch may be configured to monitor telemetry any number of accelerators and to update its telemetry table based on such monitoring.

According to one embodiment, switch 110, for example through switch processing circuitry 114 and using instructions within switch memory 118, may be configured to control the amount of power to be supplied to Accelerator 1, Accelerator 2, and Accelerator 3, for example by way of controlling power through one or more of the PMCs 1211, 1212 and 1213 on each respective accelerator. Each PMC 1211, 1212 and 1213 may be configured to receive corresponding instructions from switch 110 to adjust power to its particular accelerator. The instructions to each PMC may for example be routed to each PMC through bus 147 of each accelerator Accelerator 1, Accelerator 2 or Accelerator 3 as appropriate. Each PMC 1211, 1212 and 1213 may then be configured to execute the instructions to it to control the amount of power to its corresponding accelerator through power input connections such as the one or more voltage input pins VI 130 of respective ones of Accelerator 1, Accelerator 2 and Accelerator 3. In addition, or in the alternative, there may be one or more PMCs external to Accelerator 1, Accelerator 2 and Accelerator 3 that may be configured to regulate the amount of power to each of Accelerator 1, Accelerator 2 and Accelerator 3 through respective VIs 130. According to one embodiment, the one or more PMCs may reside within the switch processing circuitry 114 proper. According to another embodiment, the one or more PMCs may reside in respective ones of the accelerators. According to yet another embodiment, switch 110 may control the power to each accelerator by sending instructions to each accelerator to execute one or more kernels according to a certain clock frequency level, in this way indirectly controlling the power draw from each accelerator. In the latter case, one or both of processor 126 and programmable processor 140 of each accelerator may control the clock frequency at which the accelerator executes the one or more kernels.

Processing circuitries 114 and 126, or any other processing circuitries or controllers in a computing environment according to embodiments may comprise any suitable processing circuitry (it being noted that processing circuitry and processor may be used interchangeably in the instant description and associated figures), such as a microprocessor, an embedded processor, a digital signal processor (DSP), a network processor, a handheld processor, an application processor, a co-processor, a system on a chip (SOC), or other device to execute code (i.e., software instructions). Processing circuitries 114 and 126, or any other processing circuitries in a computing environment according to embodiments, may include multiple processing cores, or a single core, which may include asymmetric processing elements or symmetric processing elements. However, a processor or processing circuitry as mentioned herein may include any number of processing elements that may be symmetric or asymmetric. A processing element may refer to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads. Processing elements may also include one or more arithmetic logic units (ALUs), floating point units (FPUs), caches, instruction pipelines, interrupt handling hardware, registers, or other hardware to facilitate the operations of the processing elements.

A FPGA-based accelerator unit, such as Accelerator unit 149, according to embodiments may comprise any number of semiconductor devices that may include configurable/reprogrammable logic circuitry in the form of programmable processor 140. An FPGA-based accelerator unit may be programmed via a data structure (e.g., a bit-stream) having any suitable format that defines how the logic is to be configured. An FPGA-based accelerator unit may be reprogrammed any number of times after the FPGA-based accelerator unit is manufactured. The configurable logic of an FPGA-based accelerator unit may be programmed to implement one or more kernels. A kernel may comprise configured logic of the FPGA-based accelerator unit that may receive a set of one or more inputs, process the set of inputs using the configured logic, and provide a set of one or more outputs. The kernel may perform any suitable type of processing. In various embodiments, a kernel may comprise a video processor, an image processor, a waveform generator, a pattern recognition module, a packet processor, an encryptor, a decryptor, an encoder, a decoder, a compression device, a processor operable to perform any number of operations each specified by a distinct instruction sequence, or other suitable processing function. Some FPGA-based accelerator units may be limited to executing a single kernel at a time while other FPGA-based accelerator units may be capable of executing multiple kernels simultaneously.

Any suitable entity of a computing node may be configured to instruct an accelerator to implement one or more kernels (i.e. may register one or more kernels at the accelerator) and/or to execute the one or more kernels (i.e., to provide one or more input parameters to the accelerator to perform the functions of the kernel based on the input parameters).

A memory, such as switch memory 118, telemetry table 116/216, memory 128, and the memories within each node Node 1, Node 2 and Node 3 may store any suitable data, such as data used by processors communicatively coupled thereto to provide the functionality of computing environment 100. For example, data associated with programs that are executed or files accessed by switch processing circuitry 114 may be stored in switch memory 118. Thus, a memory device according to some embodiments may include a system memory that stores data and/or sequences of instructions that are used or executed by the processing circuitries. In various embodiments, a memory device according to some embodiments may store persistent data (e.g., a user's files or instruction sequences) that remains stored even after power to the memory device according to embodiments is removed. A memory device according to embodiments may be dedicated to a particular processing circuitry, or shared with other devices of computing environment 100. In various embodiments, a memory device according to embodiments may include a memory comprising any number of memory modules, a memory device controller, and other supporting logic. A memory module may include a plurality of memory cells that are each operable to store one or more bits. The cells of a memory module may be arranged in any suitable fashion, such as in columns and rows or three-dimensional structures. The cells may be logically grouped into banks, blocks, pages (wherein a page is a subset of a block), sub blocks, frames, word lines, bit lines, bytes, or other suitable groups. A memory module may include non-volatile memory and/or volatile memory.

Memory controller 142 may be an integrated memory controller (i.e., it is integrated on the same die or integrated circuit as programmable processor 140) that includes logic to control the flow of data going to and from the volatile memory and non-volatile memory 128. Memory controller 142 may include logic operable to read from a memory device according to embodiments, write to a memory device according to embodiments, or to request other operations from a memory device according to embodiments. During operation, memory controller 142 may issue commands including one or more addresses of the memory 128 according to embodiments in order to read data from or write data to memory (or to perform other operations). In some embodiments, memory controller 142 may be implemented in a different die or integrated circuit than that of processor 106A.

For inter-component and intra-component communications using interconnects, such as for communications between the nodes, the switch and the accelerators, or for communications within the nodes, within the switch, or within the accelerator, the protocol used to communicate over the interconnects may have any suitable characteristics of Intel Ultra Path Interconnect (UPI), Intel QuickPath Interconnect (QPI), or other known communication protocol. Network fabric connections 109 may comprise any suitable network fabric, such as an Ethernet fabric, an Intel Omni-Path Fabric, an Intel True Scale Fabric, an InfiniBand-based fabric (e.g., Infiniband Enhanced Data Rate fabric), a RapidIO fabric, or other suitable network fabric. In other embodiments, network fabric connections 109 may comprise any other suitable board-to-board or chassis-to-chassis interconnect.

Although not depicted, computer environment 100 may use one or more batteries, a renewable energy converter (e.g., solar power or motion-based energy), and/or power supply outlet connector and associated system to receive power, a display to output data provided by one or more processing circuitries, or a network interface allowing the processing circuitries to communicate over a network. In various embodiments, the battery, power supply outlet connector, display, and/or network interface may be communicatively coupled to the processing circuitries.

Figure 3:
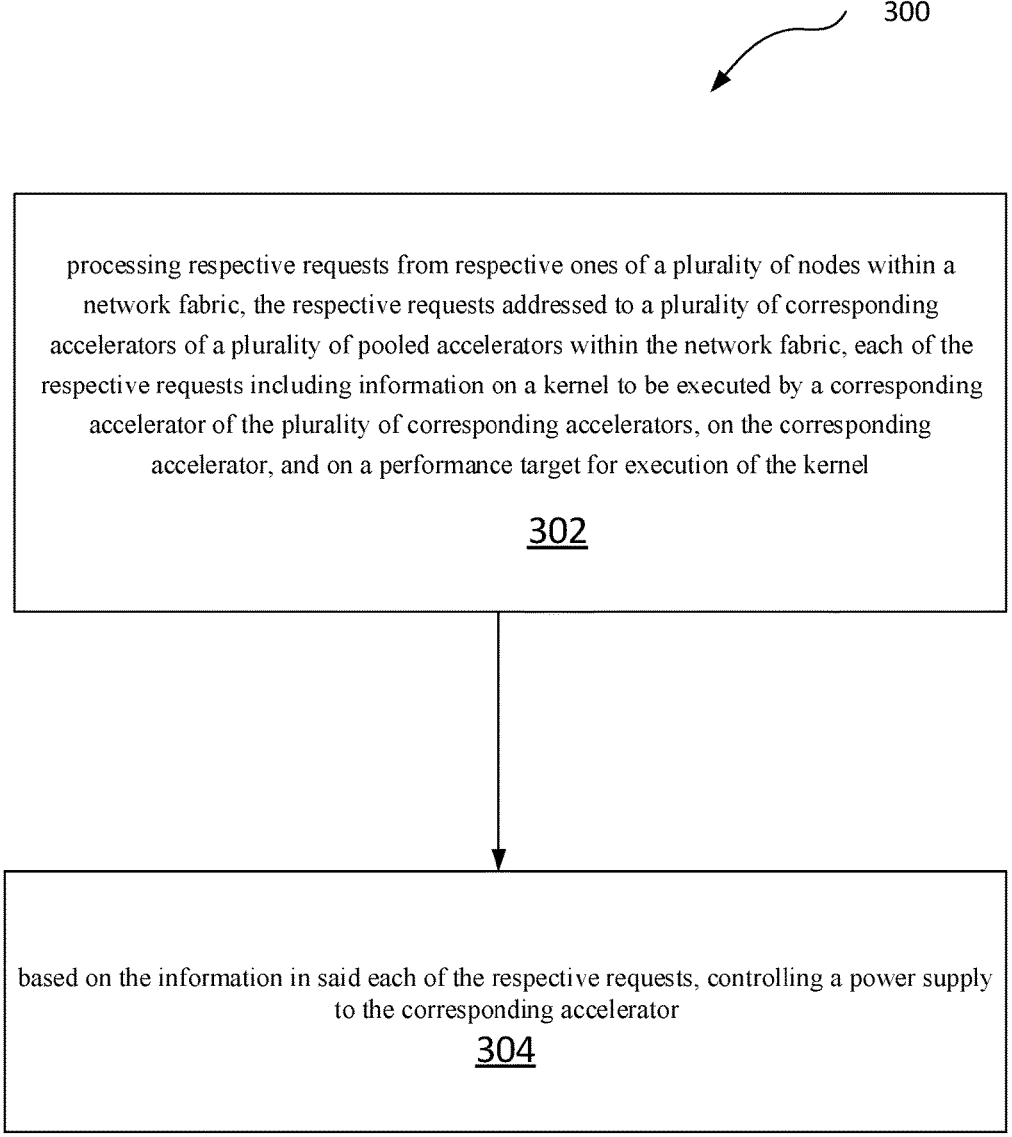
FIG. 3 is a flowchart of a first method according to some demonstrative embodiments.

FIG. 3 is a flowchart of a first method 300 according to some demonstrative embodiments. At operation 302, the method includes processing respective requests from respective ones of a plurality of nodes within a network fabric, the respective requests addressed to a plurality of corresponding accelerators of a plurality of pooled accelerators within the network fabric, each of the respective requests including information on a kernel to be executed by a corresponding accelerator of the plurality of corresponding accelerators, on the corresponding accelerator, and on a performance target for execution of the kernel. At operation 304, the method includes based on the information in said each of the respective requests, controlling a power supply to the corresponding accelerator.

Figure 4:
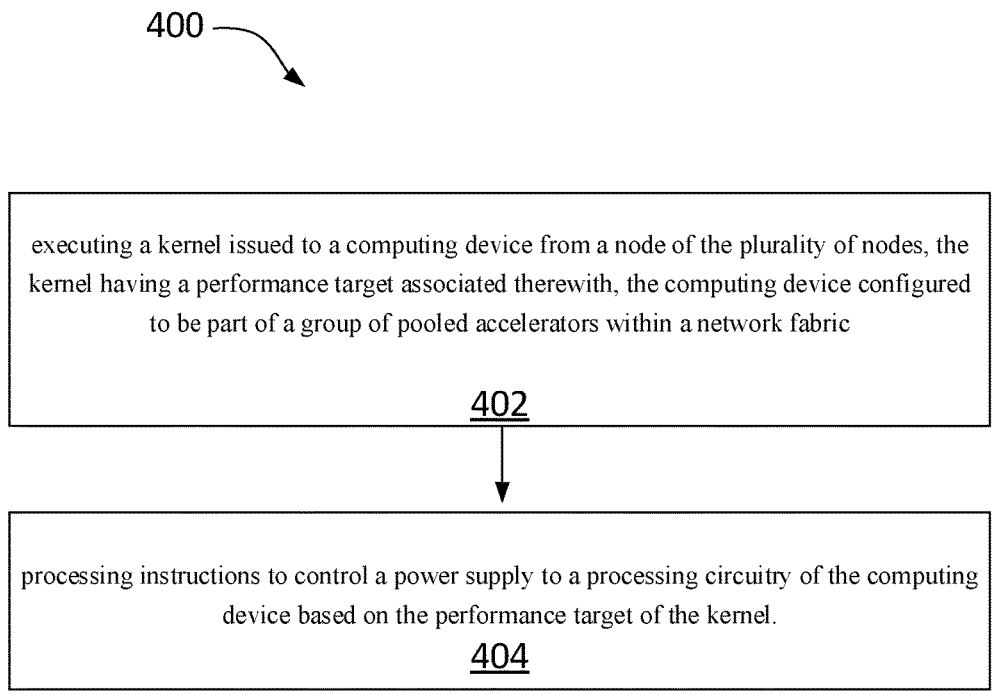
FIG. 4 is a flowchart of a second method according to some demonstrative embodiments.

FIG. 4 is a flowchart of a second method 400 according to some demonstrative embodiments. At operation 402, the method includes executing a kernel issued to a computing device from a node of the plurality of nodes, the kernel having a performance target associated therewith, the computing device configured to be part of a group of pooled accelerators within a network fabric. At operation 404, the method includes processing instructions to control a power supply to a processing circuitry of the computing device based on the performance target of the kernel.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer-readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

For example, referring back to FIG. 1, a storage unit or memory such as switch memory 118, or other memory or combination of memories of computing environment 100, may include a machine-readable medium on which is stored one or more sets of data structures or instructions (e.g., software) embodying or utilized by any one or more of the techniques or functions described herein. The instructions may also reside, completely or at least partially, within a main memory, within a static memory, or within a processing circuitry during execution thereof by the machine. In an example, one or any combination of a processing circuitry, a main memory, a static memory, or other storage device may constitute machine-readable media.

Some demonstrative embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. Those instructions may then be read and executed by one or more processors to cause a switch or an accelerator to perform the methods and/or operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

Functions, operations, components and/or features described herein with reference to one or more embodiments, may be combined with, or may be utilized in combination with, one or more other functions, operations, components and/or features described herein with reference to one or more other embodiments, or vice versa.

EXAMPLES

The following examples pertain to further embodiments.

Example 1 includes a computing device configured to be used as part of a network fabric that includes a plurality of nodes and a plurality of pooled accelerators communicatively coupled to the nodes, the computing device including: a memory storing instructions; and processing circuitry coupled to the memory, the processing circuitry to perform the instructions to: receive respective requests from respective ones of the plurality of nodes, the respective requests addressed to a plurality of corresponding accelerators of the plurality of pooled accelerators, each of the respective requests including information on a kernel to be executed by a corresponding accelerator of the plurality of corresponding accelerators, on the corresponding accelerator, and on a performance target for execution of the kernel; and based on the information in said each of the respective requests, control a power supply to the corresponding accelerator.

Example 2 includes the subject matter of Example 1, and optionally, wherein the processing circuitry is further to perform the instructions to issue the kernel to the corresponding accelerator for execution by the corresponding accelerator.

Example 3 includes the subject matter of Example 1, and optionally, wherein the processing circuitry is further to perform the instructions to: effect a monitoring of a current performance level of the corresponding accelerator during execution of the kernel; and control the power supply to the corresponding accelerator during execution of the kernel based on an updated version of the current performance level resulting from the monitoring.

Example 4 includes the subject matter of Example 1, and optionally, wherein: the device is to store a telemetry table including data mapping each of the plurality of corresponding accelerators to a current performance level, a current power supply level and a threshold power supply level for said each of the plurality of corresponding accelerators; and the processing circuitry is to perform the instructions to control the power supply by controlling the power supply to said each of the plurality of corresponding accelerators based on determining, from the telemetry table, a current performance level, the current power supply level and the threshold power supply level of said each of the plurality of corresponding accelerators.

Example 5 includes the subject matter of Example 4, and optionally, wherein the processing circuitry is to perform the instructions to control the power supply by decreasing a power supply to said each of the plurality of corresponding accelerators in response to a determination that the current performance level of said each of the plurality of corresponding accelerators is above a performance target for a kernel being executed by said each of the corresponding accelerators.

Example 6 includes the subject matter of Example 4, and optionally, wherein the processing circuitry is to perform the instructions to control the power supply by increasing a power supply to said each of the plurality of corresponding accelerators in response to a determination that the current performance level of said each of the plurality of corresponding accelerators is below a performance target for a kernel being executed by said each of the corresponding accelerators.

Example 7 includes the subject matter of Example 4, and optionally, wherein the processing circuitry is to perform the instructions to redirect power supply from a first one of the plurality of corresponding accelerators to a second one of the plurality of corresponding accelerators based on the current performance level, the current power supply level and the threshold power supply level of each of the first one and the second one of the plurality of corresponding accelerators, and further based on respective performance targets of kernels being executed by each of the first one and the second one of the plurality of corresponding accelerators.

Example 8 includes the subject matter of Example 4, and optionally, wherein the processing circuitry is to perform the instructions to effect an initial set-up of data within the telemetry table.

Example 9 includes the subject matter of Example 1, and optionally, further including at least one of a coherent switch, a memory switch or a Peripheral Component Interconnect Express (PCIe) switch including an ingress interface to receive the respective requests from the nodes, and an egress interface to control the power supply.

Example 10 includes a product comprising one or more tangible computer-readable non-transitory storage media comprising computer-executable instructions operable to, when executed by at least one computer processor, enable the at least one computer processor to implement operations at a computing device, the operations including: processing respective requests from respective ones of a plurality of nodes within a network fabric, the respective requests addressed to a plurality of corresponding accelerators of a plurality of pooled accelerators within the network fabric, each of the respective requests including information on a kernel to be executed by a corresponding accelerator of the plurality of corresponding accelerators, on the corresponding accelerator, and on a performance target for execution of the kernel; and based on the information in said each of the respective requests, controlling a power supply to the corresponding accelerator.

Example 11 includes the subject matter of Example 10, and optionally, wherein the operations further include issuing the kernel to the corresponding accelerator for execution by the corresponding accelerator.

Example 12 includes the subject matter of Example 10, and optionally, wherein the operations further include: effecting a monitoring of a current performance level of the corresponding accelerator during execution of the kernel; and controlling the power supply to the corresponding accelerator during execution of the kernel based on an updated version of the current performance level resulting from the monitoring.

Example 13 includes the subject matter of Example 10, and optionally, wherein the operations further include controlling the power supply by controlling the power supply to said each of the plurality of corresponding accelerators based on a current performance level, a current power supply level and a threshold power supply level of said each of the plurality of corresponding accelerators.

Example 14 includes the subject matter of Example 13, and optionally, wherein the operations further include controlling the power supply by decreasing a power supply to said each of the plurality of corresponding accelerators in response to a determination that the current performance level of said each of the plurality of corresponding accelerators is above a performance target for a kernel being executed by said each of the corresponding accelerators.

Example 15 includes the subject matter of Example 13, and optionally, wherein the operations further include controlling the power supply by increasing a power supply to said each of the plurality of corresponding accelerators in response to a determination that the current performance level of said each of the plurality of corresponding accelerators is below a performance target for a kernel being executed by said each of the corresponding accelerators.

Example 16 includes the subject matter of Example 13, and optionally, wherein the operations further include redirecting a power supply from a first one of the plurality of corresponding accelerators to a second one of the plurality of corresponding accelerators based on the current performance level, the current power supply level and the threshold power supply level of each of the first one and the second one of the plurality of corresponding accelerators, and further based on respective performance targets of kernels being executed by each of the first one and the second one of the plurality of corresponding accelerators.

Example 17 includes the subject matter of Example 13, and optionally, wherein the operations further include effecting an initial set-up of data within the telemetry table.

Example 18 includes a method of operating a computing device including: processing respective requests from respective ones of a plurality of nodes within a network fabric, the respective requests addressed to a plurality of corresponding accelerators of a plurality of pooled accelerators within the network fabric, each of the respective requests including information on a kernel to be executed by a corresponding accelerator of the plurality of corresponding accelerators, on the corresponding accelerator, and on a performance target for execution of the kernel; and based on the information in said each of the respective requests, controlling a power supply to the corresponding accelerator.

Example 19 includes the subject matter of Example 18, and optionally, further including issuing the kernel to the corresponding accelerator for execution by the corresponding accelerator.

Example 20 includes the subject matter of Example 18, and optionally, further including: effecting a monitoring of a current performance level of the corresponding accelerator during execution of the kernel; and controlling the power supply to the corresponding accelerator during execution of the kernel based on an updated version of the current performance level resulting from the monitoring.

Example 21 includes the subject matter of Example 18, and optionally, further including controlling the power supply by controlling the power supply to said each of the plurality of corresponding accelerators based on a current performance level, a current power supply level and a threshold power supply level of said each of the plurality of corresponding accelerators.

Example 22 includes the subject matter of Example 21, and optionally, further including controlling the power supply by one of decreasing or increasing a power supply to said each of the plurality of corresponding accelerators in response to a determination that the current performance level of said each of the plurality of corresponding accelerators is respectively one of above and below a performance target for a kernel being executed by said each of the corresponding accelerators.

Example 23 includes the subject matter of Example 21, and optionally, further including redirecting a power supply from a first one of the plurality of corresponding accelerators to a second one of the plurality of corresponding accelerators based on the current performance level, the current power supply level and the threshold power supply level of each of the first one and the second one of the plurality of corresponding accelerators, and further based on respective performance targets of kernels being executed by each of the first one and the second one of the plurality of corresponding accelerators.

Example 24 includes a computing device configured to be used as part of a network fabric that includes a plurality of nodes and a plurality of pooled accelerators communicatively coupled to the nodes, the computing device including: means for processing respective requests from respective ones of the plurality of nodes, the respective requests addressed to a plurality of corresponding accelerators of the plurality of pooled accelerators, each of the respective requests including information on a kernel to be executed by a corresponding accelerator of the plurality of corresponding accelerators, on the corresponding accelerator, and on a performance target for execution of the kernel; and means for controlling, based on the information in said each of the respective requests, a power supply to the corresponding accelerator.

Example 25 includes the subject matter of Example 24, and optionally, further including means for issuing the kernel to the corresponding accelerator for execution by the corresponding accelerator.

Example 26 includes a computing device configured to be used as part of a group of pooled accelerators communicatively coupled to a plurality of nodes through a switch within a network fabric, the computing device including: a network interface configured to be communicatively coupled to the switch; a processing circuitry communicatively coupled to the network interface to receive a kernel therefrom, the processing circuitry further to: execute the kernel, the kernel to be issued through the switch to the network interface from a node of the plurality of nodes, the kernel further having a performance target associated therewith; and process instructions from the switch to control a power supply to the processing circuitry based on the performance target of the kernel.

Example 27 includes the subject matter of Example 26, and optionally, wherein the processing circuitry is further to: effect monitoring of a current performance level of the computing device during execution of the kernel; transmit to the switch data on updated current performance levels of the computing device during execution of the kernel; and control the power supply to the processing circuitry during execution of the kernel based on the updated current performance levels resulting from the monitoring, and based on a threshold power supply level of the computing device.

Example 28 includes the subject matter of Example 27, and optionally, wherein the processing circuitry is further to: effect monitoring of a current power supply level of the computing device during execution of the kernel; transmit to the switch data on updated current power supply levels of the computing device during execution of the kernel; and control the power supply to the processing circuitry during execution of the kernel based on the updated current power supply levels resulting from the monitoring.

Example 29 includes the subject matter of Example 27, and optionally, wherein the processing circuitry is to transmit the threshold power supply level to the switch to effect an initial set-up of data within a telemetry table of the switch.

Example 30 includes the subject matter of Example 26, and optionally, wherein the processing circuitry includes a Power Management Controller (PMC) to process instructions from the switch to control a power supply to the processing circuitry based on the performance target of the kernel.

Example 31 includes the subject matter of Example 26, and optionally, further including an accelerator including a Field-Programmable-Gate-Array (FPGA)-based accelerator unit.

Example 32 includes the subject matter of Example 31, and optionally, wherein the FPGA-based accelerator unit includes a network interface (NI), and an input buffer, an output buffer, a programmable processor and a memory controller communicatively coupled to one another and to the NI.

Example 33 includes a product comprising one or more tangible computer-readable non-transitory storage media comprising computer-executable instructions operable to, when executed by at least one computer processor, enable the at least one computer processor to implement operations at a computing device, the computing device configured to be used as part of a group of pooled accelerators communicatively coupled to a plurality of nodes within a network fabric, the operations including: executing a kernel issued to the computing device from a node of the plurality of nodes, the kernel having a performance target associated therewith; and processing instructions to control a power supply to a processing circuitry of the computing device based on the performance target of the kernel.

Example 34 includes the subject matter of Example 33, and optionally, wherein the computing device is to be communicatively coupled to the plurality of nodes through a switch, the operations further including: effecting a monitoring of a current performance level of the computing device during execution of the kernel; transmitting to the switch data on updated current performance levels of the computing device during execution of the kernel; and controlling the power supply to the processing circuitry during execution of the kernel based on the updated current performance levels resulting from the monitoring, and based on a threshold power supply level of the computing device.

Example 35 includes the subject matter of Example 34, and optionally, the operations further comprising: effecting monitoring of a current power supply level of the computing device during execution of the kernel; transmitting to the switch data on updated current power supply levels of the computing device during execution of the kernel; and controlling the power supply to the processing circuitry during execution of the kernel based on the updated current power supply levels resulting from the monitoring.

Example 36 includes the subject matter of Example 34, and optionally, the operations further comprising transmitting the threshold power supply level to the switch to effect an initial set-up of data within a telemetry table of the switch.

Example 37 includes a method to be performed at a computing device, the computing device configured to be used as part of a group of pooled accelerators communicatively coupled to a plurality of nodes within a network fabric, the method including: executing a kernel issued to the computing device from a node of the plurality of nodes, the kernel having a performance target associated therewith; and processing instructions to control a power supply to a processing circuitry of the computing device based on the performance target of the kernel.

Example 38 includes the subject matter of Example 37, and optionally, wherein the computing device is to be communicatively coupled to the plurality of nodes through a switch, the method further including: effecting a monitoring of a current performance level of the computing device during execution of the kernel; transmitting to the switch data on updated current performance levels of the computing device during execution of the kernel; and controlling the power supply to the processing circuitry during execution of the kernel based on the updated current performance levels resulting from the monitoring, and based on a threshold power supply level of the computing device.

Example 39 includes the subject matter of Example 38, and optionally, further comprising: effecting monitoring of a current power supply level of the computing device during execution of the kernel; transmitting to the switch data on updated current power supply levels of the computing device during execution of the kernel; and controlling the power supply to the processing circuitry during execution of the kernel based on the updated current power supply levels resulting from the monitoring.

Example 40 includes the subject matter of Example 38, and optionally, further comprising transmitting the threshold power supply level to the switch to effect an initial set-up of data within a telemetry table of the switch.

Example 41 includes a device configured to be used as part of a group of pooled accelerators communicatively coupled to a plurality of nodes through a switch within a network fabric, the computing device including: executing a kernel issued to the computing device from a node of the plurality of nodes, the kernel having a performance target associated therewith; and processing instructions to control a power supply to a processing circuitry of the computing device based on the performance target of the kernel.

Example 42 includes the subject matter of Example 41, and optionally, wherein the computing device is to be communicatively coupled to the plurality of nodes through a switch, the computing device further including: means for effecting a monitoring of a current performance level of the computing device during execution of the kernel; means for transmitting to the switch data on updated current performance levels of the computing device during execution of the kernel; and means for controlling the power supply to the processing circuitry during execution of the kernel based on the updated current performance levels resulting from the monitoring, and based on a threshold power supply level of the computing device.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. A computing device configured to be used as part of a network fabric that includes a plurality of nodes and a plurality of pooled accelerators communicatively coupled to the nodes, the computing device including:
   a memory storing instructions; and
      processing circuitry coupled to the memory, the processing circuitry to perform the instructions to:
         receive respective requests from respective ones of the plurality of nodes, the respective requests addressed to a plurality of corresponding accelerators of the plurality of pooled accelerators, each of the respective requests including information on a kernel to be executed by a corresponding accelerator of the plurality of corresponding accelerators, on the corresponding accelerator, and on a performance target for execution of the kernel; and
         based on the information in said each of the respective requests, control a power supply to the corresponding accelerator.

2. The computing device of claim 1, wherein the processing circuitry is further to perform the instructions to issue the kernel to the corresponding accelerator for execution by the corresponding accelerator.

3. The computing device of claim 1, wherein the processing circuitry is further to perform the instructions to:
   effect a monitoring of a current performance level of the corresponding accelerator during execution of the kernel; and
   control the power supply to the corresponding accelerator during execution of the kernel based on an updated version of the current performance level resulting from the monitoring.

4. The computing device of claim 1, wherein:
   the device is to store a telemetry table including data mapping each of the plurality of corresponding accelerators to a current performance level, a current power supply level and a threshold power supply level for said each of the plurality of corresponding accelerators; and
   the processing circuitry is to perform the instructions to control the power supply by controlling the power supply to said each of the plurality of corresponding accelerators based on determining, from the telemetry table, a current performance level, the current power supply level and the threshold power supply level of said each of the plurality of corresponding accelerators.

5. The computing device of claim 4, wherein the processing circuitry is to perform the instructions to control the power supply by decreasing a power supply to said each of the plurality of corresponding accelerators in response to a determination that the current performance level of said each of the plurality of corresponding accelerators is above a performance target for a kernel being executed by said each of the corresponding accelerators.

6. The computing device of claim 4, wherein the processing circuitry is to perform the instructions to control the power supply by increasing a power supply to said each of the plurality of corresponding accelerators in response to a determination that the current performance level of said each of the plurality of corresponding accelerators is below a performance target for a kernel being executed by said each of the corresponding accelerators.

7. The computing device of claim 4, wherein the processing circuitry is to perform the instructions to redirect power supply from a first one of the plurality of corresponding accelerators to a second one of the plurality of corresponding accelerators based on the current performance level, the current power supply level and the threshold power supply level of each of the first one and the second one of the plurality of corresponding accelerators, and further based on respective performance targets of kernels being executed by each of the first one and the second one of the plurality of corresponding accelerators.

8. The computing device of claim 4, wherein the processing circuitry is to perform the instructions to effect an initial set-up of data within the telemetry table.

9. The computing device of claim 1, further including at least one of a coherent switch, a memory switch or a Peripheral Component Interconnect Express (PCie) switch including an ingress interface to receive the respective requests from the nodes, and an egress interface to control the power supply.

10. A product comprising one or more tangible computer-readable non-transitory storage media comprising computer-executable instructions operable to, when executed by at least one computer processor, enable the at least one computer processor to implement operations at a computing device, the operations including:
   processing respective requests from respective ones of a plurality of nodes within a network fabric, the respective requests addressed to a plurality of corresponding accelerators of a plurality of pooled accelerators within the network fabric, each of the respective requests including information on a kernel to be executed by a corresponding accelerator of the plurality of corresponding accelerators, on the corresponding accelerator, and on a performance target for execution of the kernel; and
   based on the information in said each of the respective requests, controlling a power supply to the corresponding accelerator.

11. The product of claim 10, wherein the operations further include issuing the kernel to the corresponding accelerator for execution by the corresponding accelerator.

12. The product of claim 10, wherein the operations further include:
   effecting a monitoring of a current performance level of the corresponding accelerator during execution of the kernel; and
   controlling the power supply to the corresponding accelerator during execution of the kernel based on an updated version of the current performance level resulting from the monitoring.

13. The product of claim 10, wherein the operations further include controlling the power supply by controlling the power supply to said each of the plurality of corresponding accelerators based on a current performance level, a current power supply level and a threshold power supply level of said each of the plurality of corresponding accelerators.

14. The product of claim 13, wherein the operations further include controlling the power supply by decreasing a power supply to said each of the plurality of corresponding accelerators in response to a determination that the current performance level of said each of the plurality of corresponding accelerators is above a performance target for a kernel being executed by said each of the corresponding accelerators.

15. The product of claim 13, wherein the operations further include controlling the power supply by increasing a power supply to said each of the plurality of corresponding accelerators in response to a determination that the current performance level of said each of the plurality of corresponding accelerators is below a performance target for a kernel being executed by said each of the corresponding accelerators.

16. The product of claim 13, wherein the operations further include redirecting a power supply from a first one of the plurality of corresponding accelerators to a second one of the plurality of corresponding accelerators based on the current performance level, the current power supply level and the threshold power supply level of each of the first one and the second one of the plurality of corresponding accelerators, and further based on respective performance targets of kernels being executed by each of the first one and the second one of the plurality of corresponding accelerators.

17. The product of claim 13, wherein the operations further include effecting an initial set-up of data within a telemetry table.

18. A computing device configured to be used as part of a network fabric that includes a plurality of nodes and a plurality of pooled accelerators communicatively coupled to the nodes, the computing device including:
    means for processing respective requests from respective ones of the plurality of nodes, the respective requests addressed to a plurality of corresponding accelerators of the plurality of pooled accelerators, each of the respective requests including information on a kernel to be executed by a corresponding accelerator of the plurality of corresponding accelerators, on the corresponding accelerator, and on a performance target for execution of the kernel; and
    means for controlling, based on the information in said each of the respective requests, a power supply to the corresponding accelerator.

19. The computing device of claim 18, further including means for issuing the kernel to the corresponding accelerator for execution by the corresponding accelerator.

20. A computing device configured to be used as part of a group of pooled accelerators communicatively coupled to a plurality of nodes through a switch within a network fabric, the computing device including:
    a network interface configured to be communicatively coupled to the switch;
    a processing circuitry communicatively coupled to the network interface to receive a kernel therefrom, the processing circuitry further to:
        execute the kernel, the kernel to be issued through the switch to the network interface from a node of the plurality of nodes, the kernel further having a performance target associated therewith; and
        process instructions from the switch to control a power supply to the processing circuitry based on the performance target of the kernel.

21. The computing device of claim 20, wherein the processing circuitry is further to:
    effect monitoring of a current performance level of the computing device during execution of the kernel;
    transmit to the switch data on updated current performance levels of the computing device during execution of the kernel; and
    control the power supply to the processing circuitry during execution of the kernel based on the updated current performance levels resulting from the monitoring, and based on a threshold power supply level of the computing device.

22. The computing device of claim 21, wherein the processing circuitry is further to:
    effect monitoring of a current power supply level of the computing device during execution of the kernel;
    transmit to the switch data on updated current power supply levels of the computing device during execution of the kernel; and
    control the power supply to the processing circuitry during execution of the kernel based on the updated current power supply levels resulting from the monitoring.

23. The computing device of claim 21, wherein the processing circuitry is to transmit the threshold power supply level to the switch to effect an initial set-up of data within a telemetry table of the switch.

24. The computing device of claim 20, wherein the processing circuitry includes a Power Management Controller (PMC) to process instructions from the switch to control a power supply to the processing circuitry based on the performance target of the kernel.

25. The computing device of claim 20, further including an accelerator including a Field-Programmable-Gate-Array (FPGA)-based accelerator unit.

* * * * *